United States Patent [19]

Hirose et al.

[11] 4,261,878

[45] Apr. 14, 1981

[54] TAP HOLE MIXES

[75] Inventors: Takao Hirose, Kamakura; Seiichi Uemura, Kawasaki, both of Japan

[73] Assignees: Nippon Oil Co., Ltd.; Shinagawa Refractories Co., Ltd., both of Tokyo, Japan

[21] Appl. No.: 44,666

[22] Filed: Jun. 1, 1979

[30] Foreign Application Priority Data

Jul. 24, 1978 [JP] Japan ................................. 53/89414

[51] Int. Cl.³ ................................................ C08K 3/00
[52] U.S. Cl. ................................ 260/38; 260/33.6 R; 260/33.6 AQ; 260/42; 260/42.54; 260/998.18

[58] Field of Search ............ 260/38, DIG. 40, 998.18, 260/33.6 R, 33.6 AQ, 42, 42.54

[56] References Cited

U.S. PATENT DOCUMENTS

| | | | |
|---|---|---|---|
| 2,751,650 | 6/1956 | Froberger | 260/DIG. 40 |
| 3,852,232 | 12/1974 | Bowman et al. | 260/38 |

*Primary Examiner*—Melvyn I. Marquis
*Attorney, Agent, or Firm*—Jordan and Hamburg

[57] ABSTRACT

A tap hole mix for blocking the pig iron or steel tap hole of furnaces, comprising refractory material and a binder comprising a petroleum-derived heavy oil having at least 25% Conradson carbon and an aromatic petroleum resin.

20 Claims, No Drawings

TAP HOLE MIXES

This invention relates to mixes for blocking tap holes for melted pig iron or steel and more particularly to refractory mixes for blocking pig iron tap holes of blast furnaces.

With the recent enlargement of blast furnaces and enhanced-pressure operation thereof, the production capacity of the furnaces and the number of times of pig iron discharged therefrom have been remarkably increased. Because of this, for example, the operation and safety of opening and closing of the pig iron tap hole of the furnaces have been regarded as very important from the view-point of the overall operation and increase of productivity of the furnaces and, therefore, the requirements for refractory mixes for blocking the pig iron tap hole (the mix being hereinafter sometimes referred to as "tap hole mix") are very severe and those which will meet such requirements are sought to be rapidly developed.

In general, the main properties required in refractory mixes for blocking the pig iron tap hole of blast furnace or the like, are illustrated below.
(1) Refractory tap hole mixes should be filled in easily by guns such as mud guns,
(2) They should be hardened soon after being filled in, and their initial strength should be high,
(3) They should have high bond strength at high temperatures thereby making it possible to lengthen the duration of discharge of pig iron,
(4) They should facilitate the operation of opening the outlet or tap, and
(5) They should neither generate much of black smoke nor cause unusual dust generation.

Refractory tap hole mixes which have heretofore been generally used are blends prepared by kneading alumina, Schamotte (fireclay), agalmatolite, coke, clay and/or the like with a coal tar-derived binder.

However, the conventional tap hole mixes containing the coal tar-derived binders are disadvantageous in that they will take a longer time to be hardened and require a long time to be baked when used, thereby requiring a long time to complete blocking therewith by the use of a gun and consequently lowering the productivity. In addition, the coal tar-derived binders and no more suitable for the recent high pressure and large-sized blast furnaces from which pig iron is discharged at a high temperature and rate, and they will be pyrolyzed at a high temperature within evolution of an yellow-colored pungent gas thereby raising serious problems as to the health of workers handling the binders. There have recently been known the techniques of using thermosetting resin binders, such as phenol resins and furan resins, in substitution for the coal tar-derived binders. However, tap hole mixes containing such thermosetting resins as the main component of binders are disadvantageous that they tend to harden during storage and extrusion thereof thereby rendering the extrusion thereof difficult and that they when used will evolve decomposition gases and the like which have a highly pungent odor thereby leaving operational problems to be solved.

A primary object of this invention is to provide a tap hole mix containing as binders a petroleum-derived heavy oil having at least 25% Conradson carbon (i.e. which will produce at least 25% Conradson carbon residue when subjected to Standard Test Method ANSI/ASTM D 189-76) and an aromatic petroleum resin.

The binders of this invention have very excellent affinity with the refractory material, and tap hole mixes of this invention are very excellently kneadable, extrudable and capable of being densely packed when filling the pig iron or steel tap hole therewith for blocking the hole and exhibit excellent pressure-resistant strength even at high temperatures. In addition, the tap hole mixes of this invention will hardly evolve harmful gases when used, thereby to solve problems as to environmental pollution and the health of workers.

The petroleum-derived heavy oils having at least 25% Conradson carbon used in the tap hole mix of this invention may be obtained by treating a starting petroleum-derived heavy oil such as a crude oil or a residual oil obtained by the distillation of a crude oil under atmospheric or a reduced pressure, with a light hydrocarbon solvent such as propane and butane at a temperature of usually 50°–150° C. and a pressure of about 10–40 Kg/cm$^2$G to remove the solvent-soluble materials therefrom. They may also be obtained by heat treating the aforesaid starting heavy oil or an ethylene bottom oil at a temperature of 350°–500° C. for a time, such as 1 minute to 5 hours, sufficient to obtain a desired oil having at least 25% Conradson carbon. The ethylene bottom oil used herein is a residual oil boiling at at least 150° C. obtained as a by-product at the time of thermocracking or steam cracking a light hydrocarbon fraction such as naphtha, kerosene or gas oil at usually 600°–1000° C. to obtain olefins.

The aromatic petroleum resins used in the tap hole mixes of this invention may be obtained, for example, by either catalytically polymerizing a cracked oil fraction having a boiling range of 140°–280° C. in the presence of a Friedel-Crafts' type catalyst such as boron trifluoride, aluminum chloride or a complex thereof at −30° to +40° C. for 10 minutes to 10 hours or thermally polymerizing said cracked oil fraction at 150°–250° C. for 10 minutes to 10 hours, the cracked oil fraction being obtained as one of by-products at the time of thermocracking or steam cracking a light hydrocarbon fraction such as naphtha, kerosene or gas oil at usually 600°–1000° C. to produce olefins such as ethylene.

The aromatic petroleum resins used in this invention may preferably have a softening point of 50°–160° C. and a number average molecular weight of 500–2000, and they may preferably have an aromatic content expressed in terms of an aromatic proton concentration of at least 30% as determined by NMR (nuclear magnetic resonance) spectra.

The petroleum-derived heavy oil having at least 25% Conradson carbon and the aromatic petroleum resin used in combination as the binder in the tap hole mixes of this invention may preferably be mixed with each other in ratios by weight of from 60–95% to 40–5%.

In this invention, the binder may be incorporated with a thermosetting resin if required, to enable the tap hole mix to be hardened more rapidly after filling of the pig iron tap hole.

The thermosetting resins used herein include resol-type phenol resins as preferable ones. The resol-type phenol resins used herein may be obtained by reacting phenol with formaldehyde in a molar ratio of usually 1:1–3 generally using sodium hydroxide or ammonia as the catalyst.

The preferable resol-type phenol resins used in this invention are those having an average molecular weight of 100–500.

The thermosetting resins may be added to the petroleum-derived heavy oil having at least 25% Conradson carbon and aromatic petroleum resin in an amount by weight of not more than 20 parts, preferably 3-15 parts, per 100 parts by weight of the total of the latter two. The addition of the thermosetting resins in an amount of more than 20 parts by weight will result in the production of tap hole mixes which will be liable to harden during the storage or extrusion thereof and will leave a part thereof unreacted and produce decomposition gases when used, thereby raising problems as to operations. On the other hand, the use of less than 3 parts by weight of the thermosetting resin will result in the production of tap hole mixes which will tend to harden less effectively after the pig iron tap hole is filled therewith.

The binder used in this invention is required to have a viscosity of 100–10,000 centipoise, preferably 300–3,000 centipoise, at 50° C. Binders having a lower viscosity than the above will not exhibit plasticity necessary for the extrusion thereof when used, while it will be difficult to knead binders having a higher viscosity with the refractory materials.

To adjust the viscosity, the binders may be incorporated with a petroleum fraction boiling at at least 150° C., preferably 150°–600° C., as required. The petroleum fractions boiling at at least 150° C. used herein should preferably have a viscosity of not higher than 100 cp and include Fuel Oils Nos. 1-5 grades prescribed in ASTM D 396 and lubricating oil fractions such as SAE 10, SAE 20 and 70 pale oil. These petroleum fractions may be used alone or in mixture. In this case it is desirable that the amount of the petroleum fractions to be added for the adjustment of the viscosity of the binders be in the range of not more than 50% by weight, based on the total weight of the petroleum-derived heavy oil having at least 25% Conradson carbon and the aromatic petroleum resin or in the range of not more than 60 parts by weight, based on 100 parts by weight of said petroleum-derived heavy oil.

The refractory materials used in this invention include chamotte, pyrophyllite, coke, clay, bauxite, alumina, carborundum and silicon carbide. As required, the refractory materials may previously be incorporated with silicon nitride or ferrosilicon nitride as an erosion resistance improver. The erosion resistance improver may be used in an amount of not more than 15 parts, preferably 2-10 parts, by weight, based on 100 parts by weight of refractory materials. The improver may also be incorporated with metallic silicon of ferrosilicon as a strengthening material at high temperatures as required. The strengthening material may be used in an amount of not more than 15 parts, preferably 2-10 parts, by weight per 100 parts by weight of refractory materials.

In this invention, the refractory materials may previously be incorporated with, as a sintering agent, powdery pitch having a softening point of 90°–300° C. and at least 40% of fixed carbon and containing 10–80% of quinoline-insoluble matter. The particularly preferable powdery pitch may be a petroleum-derived pitch having a softening point of 150°–250° C. and at least 50% of fixed carbon and containing 20–70% of quinoline-insoluble matter.

The tap hole mixes containing such refractory materials previously incorporated with the sintering agent will decrease in loss caused by molten pig iron and enable a tapping time to be more lengthened when the tap hole blocked with the tap hole mix is opened for discharge of the molten pig iron. The sintering agent may be added in an amount of usually not more than 25 parts, preferably 3-20 parts, by weight per 100 parts by weight of refractory materials.

In this invention, the binder containing the heavy oil having at least 25% Conradson carbon and the aromatic petroleum resin is satisfactorily wettable with the refractory materials such as alumina, coke and chamotte thereby improving the kneadability of the binder with the refractory materials. The tap hole mix of this invention may be extruded at a lower pressure, while the mix so extruded has an increased apparent specific gravity. Because of this, the tap hole mix of this invention may have an increased strength at high temperatures and may also have an improved erosion and wear resistance to molten pig iron, steel, slag and the like.

The binder may preferably be added to the refractory materials in an amount by weight of 15–40 parts per 100 parts by weight of refractory materials. The use of the binder in an amount by weight of less than 15 parts will result in the production of a tap hole mix having inferior plasticity thereby making it difficult to inject the mix with an injector or gun, while the use thereof in an amount by weight of more than 50 parts is disadvantageous in that the resulting tap hole mix will evolve a large amount of gases thereby causing blowing-back phenomena and consequently raising problems as to sudden drainage of molten pig iron or steel after the filling of the pig iron or steel tap hole with the mix and that the mix after sintered will produce many cavities therein thereby raising problems as to, for example, a decrease of the sintered mix in erosion resistance. The tap hole mixes may easily be produced by adding the binder to refractory materials such as alumina, carborundum, coke and clay and kneading the whole by the use of an ordinary kneader.

This invention will be better understood by the following non-limitative Examples wherein all parts and percentages are by weight unless otherwise specified.

EXAMPLE 1

A residual oil boiling at 150° C. or higher produced as a by-product at the time of steam cracking of naphtha, was heat treated at 390° C. and 8 Kg/cm$^2$.G for 3 hours and then stripping the thus treated oil of a fraction boiling at 200° C. or lower thereby to obtain a petroleum-derived heavy oil having 36% Conradson carbon and a viscosity of 500 cp (centipoise) at 50° C.

On the other hand, a fraction boiling in the range of 180°–270° C. obtained by the thermocracking of naphtha at 800° C. was reacted at 10° C. in the presence of boron trifluoride for 7 hours thereby to obtain an aromatic petroleum resin having a softening point of 90° C.

Ninety (90)% of the petroleum-derived heavy oil were blended with 10% of the aromatic petroleum resin to obtain a binder having a viscosity of 1600 cp at 50° C. 25 parts of the binder so obtained were blended with 100 parts of refractory materials, the refractory materials being composed of coarse particles (5–1 mm), medium particles (1–0.1 mm) and fine particles (finer than 0.1 mm) as indicated in the following Table 1, to form a blend which was then kneaded in an ordinary kneader heated to 50° C. thereby obtaining a tap hole mix for blocking the pig iron tap hole of blast furnaces. The kneadability of said blend in the kneader was very satisfactory and it took 5 minutes to make the blend satisfactorily and uniformly kneaded.

The tap hole mix so obtained was tested by the use of a small-sized injector or gun for injection property at 50° C. The injection pressure was found to be 14 Kg/cm$^2$, this indicating that the tap hole mix of this invention had a very excellent injection property as compared with those obtained in the following Comparative examples 1, 2 and 3.

The aforesaid tap hole mix was molded at a molding pressure of 50 Kg/cm$^2$ to obtain a molding having a size of 40×40×150 mm. The molding so obtained was heated to 1000° C. for one hour in a reducing atmosphere and then tested for bending strength at room temperature. The bending strength obtained was 32Kg/cm$^2$ which was clearly excellent as compared with those obtained in Comparative examples 1, 2 and 3.

TABLE 1

| Coarse particles | Coke | 20 Parts |
| --- | --- | --- |
| Coarse particles | Alumina | 20 Parts |
| Medium particles | Silicon carbide | 15 Parts |
| Medium particles | Coke | 15 Parts |
| Medium particles | Alumina | 10 Parts |
| Fine particles | Clay | 10 Parts |
| Fine particles | Silicon carbide | 10 Parts |

EXAMPLE 2

Twenty (20)% of a residual oil obtained by the distillation of a crude oil at a reduced pressure of 50 mm Hg and a temperature of 380° C. was extracted with 80% of propane at 80° C. and 35 Kg/cm$^2$.G to remove the extracts therefrom thereby obtaining a petroleum-derived heavy oil having 31% Conradson carbon. There were mixed together 60% of the thus obtained petroleum-derived heavy oil, 10% of an aromatic petroleum resin having a softening point of 120° C. as obtained in the same manner as in Example 1, and 30% of a fraction boiling at 200°–350° C. obtained by the distillation of a crude oil at atmospheric pressure, this fraction being mixed to adjust the viscosity of the resulting mixture, thereby to obtain a binder (having a viscosity of 900 cp at 50° C.) for tap hole mixes. 23 parts of the thus obtained binder were added to a mixture of 100 parts of refractory materials as indicated in Table 1 and 8 parts of powdery petroleum-derived pitch having a softening point of as high as 220° C., to form a blend which was kneaded in a kneader heated to 50° C. thereby to obtain a tap hole mix for blocking the pig iron tap hole of blast furnaces. The kneadability of the aforesaid blend was very satisfactory and it took 4 minutes to make the blend satisfactorily and uniformly kneaded.

The thus obtained tap hole mix was tested for injection property in the same manner as in Example 1 with the result that an injection pressure of 12 Kg/cm$^2$ was obtained. In addition, the mix was tested for bending strength in the same manner as in Example 1 after its heat treatment at 1000° C. for 1 hour with the result that a bending strength of 36 Kg/cm$^2$ was obtained. Thus, the mix of this invention clearly exhibited superior performances as compared with those obtained in the following Comparative examples 1, 2 and 3.

COMPARATIVE EXAMPLE 1

Twenty-five (25) parts of the petroleum-derived heavy oil as obtained in Example 1 were added as the binder to 100 parts of the refractory materials as indicated in Table 1 in quite the same manner as in Example 1, to form a blend which was then kneaded to obtain a tap hole mix for blocking the pig iron tap hole of blast furnaces. It took 12 minutes to make the blend uniformly kneaded. The tap hole mix so obtained was tested for injection pressure in the same manner as in Example 1 and, as the result, an injection pressure of 23 Kg/cm$^2$ was obtained. Further, the tap hole mix exhibited a bending strength of 24 Kg/cm$^2$ after its heat treatment at 1000° C. for one hour.

COMPARATIVE EXAMPLE 2

Seventy (70)% of the petroleum-derived heavy oil as obtained in Example 2 were mixed with 30% of a fraction boiling at 200°–350° C. obtained by the distillation of a crude oil at atmospheric pressure, to obtain a binder for tap hole mixes.

The procedure of Example 2 was followed except that the above binder was substituted, thereby to obtain a tap hole mix for blocking the pig iron tap hole of blast furnaces. The materials for this tap hole mix took 10 minutes to make a uniformly kneaded mass.

The injection pressure obtained with the tap hole mix in the same manner as in Example 1 was 22 Kg/cm$^2$ and the bending strength of the mix after its heat treatment at 1000° C. for one hour was 26 Kg/cm$^2$.

COMPARATIVE EXAMPLE 3

Sixty-five (65)% of the same aromatic petroleum resin having a softening point of 90° C. as used in Example 1 was mixed with 35% of a fraction boiling at 200°–350° C. obtained by the distillation of a crude oil at atmospheric pressure, thereby to obtain a binder for tap hole mixes. Twenty-five (25) parts of the thus obtained binder were added to 100 parts of the refractory materials as indicated in Table 1, to form a blend which was kneaded to obtain a tap hole mix for blocking the pig iron tap hole of blast furnaces.

It took 12 minutes to make the blend uniformly kneaded. The tap hole mix was tested for injection pressure in the same manner as in Example 1 with the result being 40 Kg/cm$^2$. In addition, the mix exhibited a bending strength of 4 Kg/cm$^2$ after it had been heat treated at 1000° C. for one hour.

EXAMPLE 3

There were mixed together (A) 60% of the petroleum-derived heavy oil as obtained in Example 2, (B) 30% of a mixture in equal amounts (by weight) of a fraction boiling at 170°–258° C. obtained by the distillation of an Arabian crude oil at atmospheric pressure with a fraction boiling at 226°–362° C. obtained by the distillation of the same crude oil at atmospheric pressure and (C) 10% of the same aromatic petroleum resin having a softening point of 90° C. as used in Example 1, thereby to obtain a binder for tap hole mixes. 23 parts of the binder so obtained were added to 100 parts of the refractory materials as indicated in Table 1 in the same manner as in Example 1, to form a blend which was then kneaded thereby obtaining a tap hole mix for blocking the pig iron tap hole of blast furnaces.

It took 4 minutes to make said blend uniformly kneaded. The tap hole mix was tested for injection pressure in the same manner as in Example 1, with the result being 10 Kg/cm$^2$. The tap hole mix exhibited a bending strength of 31 Kg/cm$^2$ after it had been heat treated at 1000° C. for one hour. The tap hole mix was molded at a molding pressure of 50 Kg/cm$^2$ to obtain a cylindrical molding having a size of 40 dia.×40 mm height. When the cylindrical molding was allowed to stand in a reducing atmosphere at 300° C., it took 32 minutes (such a time being hereinafter referred as "hardening time") for the molding to increase in pressure resistance to 20 $Kg/cm^2$.

EXAMPLE 4

There were mixed together (A) 55% of the petroleum-derived heavy oil as obtained in Example 2, (B) 30% of a mixture in equal amounts (by weight) of a fraction boiling at 170°–258° C. obtained by the distillation of an Arabian crude oil at atmospheric pressure with a fraction boiling at 226°–362° C. obtained by the distillation of the same crude oil at atmospheric pressure, (C) 10% of the same aromatic petroleum resin having a softening point of 90° C. as used in Example 1 and (D) 5% of a resol-type phenol resin having an average molecular weight of 200, thereby to obtain a binder for tap hole mixes having a viscosity of 980 cp at 50° C.

Twenty-three (23) parts of the thus obtained binder were added to 100 parts of the refractory materials as indicated in Table 1 in the same manner as in Example 1, to form a blend which was then kneaded thereby obtaining a tap hole mix for blocking the pig iron tap hole of blast furnaces. It took 6 minutes to make the blend uniformly kneaded in a kneader. The injection pressure (for the mix) measured in the same manner as in Example 1 was 13 $Kg/cm^2$, and the mix exhibited a bending strength of 31 $Kg/cm^2$ after its heat treatment at 1000° C. for one hour. In addition, the hardening time measured in the same manner as in Example 3 was 20 minutes.

EXAMPLE 5

There were mixed together 58% of the petroleum-derived heavy oil as obtained in Example 2, 20% of a fraction boiling at 170°–258° C. obtained by the distillation of an Arabian crude oil at atmospheric pressure, 10% of a fraction boiling at 330° C. or higher obtained from the bottoms at the time of distillation of the same crude oil at atmospheric pressure and 12% of the same aromatic petroleum resin having a softening point of 90° C. as used in Example 1, thereby to obtain a binder having a viscosity of 850 cp at 50° C. and being useful for tap hole mixes.

Twenty-three (23) parts of the thus obtained binder were added to a mixture of 100 parts of the refractory materials as indicated in Table 1 and 5 parts of powdery petroleum-derived pitch having a softening point of as high as 220° C., to form a blend which was then kneaded in a kneader heated to 50° C. thereby obtaining a tap hole mix for blocking the pig iron tap hole of blast furnaces. The kneadability of the blend in the kneader was very satisfactory, and it took 4 minutes to make the blend uniformly kneaded.

The thus obtained tap hole mix was measured for injection pressure in the same manner as in Example 1, with the result being 13 $Kg/cm^2$. Further, the mix exhibited a bending strength of 37 $Kg/cm^2$ after its heat treatment at 1000° C. for one hour. Thus, the aforesaid mix clearly exhibited excellent performances as compared with those obtained in Comparative examples 1, 2 and 3. Furthermore, the hardening time measured in the same manner as in Example 3 was 30 minutes.

EXAMPLE 6

There were mixed together (A) 55% of the petroleum-derived heavy oil as obtained in Example 2, (B) 30% of a mixture in equal amounts (by weight) of a fraction boiling at 170°–258° C. obtained by the distillation of an Arabian crude oil at atmospheric pressure and a fraction boiling at 226°–362° C. obtained by the distillation of the same crude oil at atmospheric pressure, (C) 10% of the same aromatic petroleum resin having a softening point of 90° C. as used in Example 1 and (D) 5% of a resol-type phenol resin having an average molecular weight of 200, thereby to obtain a binder for tap hole mixes, which had a viscosity of 900 cp at 50° C.

Twenty-three (23) parts of the thus obtained binder were added to a mixture of 100 parts of the refractory materials as indicated in Table 1 and 8 parts of powdery petroleum-derived pitch having a softening point of as high as 220° C., to form a blend which was then kneaded in a kneader heated to 50° C. thereby obtaining a tap hole mix for blocking the pig iron tap hole of blast furnaces. The kneadability of said blend in the kneader was very satisfactory, and it took 6 minutes to make the blend uniformly kneaded.

The tap hole mix so obtained was measured for injection property in the same manner as in Example 1 with the result that an injection pressure of 14 $Kg/cm^2$ was obtained. Further, the mix exhibited a bending strength of 40 $Kg/cm^2$ after having been heat treated at 1000° C. for one hour. The hardening time measured in the same manner as in Example 3 was 18 minutes.

EXAMPLE 7

Sixty (60) parts of the petroleum-derived heavy oil as obtained in Example 2, 20% of a fraction boiling at 232°–374° C. obtained by the distillation of a Khafji crude oil at atmospheric pressure, 10% of a fraction having a viscosity of 45 cp at 50° C. obtained by distilling the same crude oil at atmospheric pressure to obtain bottoms boiling at not lower than 380° C. and then distilling the thus obtained bottoms at a reduced pressure (60 mm Hg) and 10% of the same aromatic petroleum resin having a softening point of 90° C. as used in Example 1, thereby to obtain a binder for tap hole mixes, having a viscosity of 1300 cp at 50° C.

Twenty-five (25) parts of the thus obtained binder were added to 100 parts of the refractory materials as indicated in Table 1 to form a blend which was then kneaded thereby obtaining a tap hole mix for blocking the pig iron tap hole of blast furnaces.

It took 7 minutes to make said blend uniformly kneaded. The injection pressure measured in the same manner as in Example 1 was 10 $Kg/cm^2$. The mix exhibited a bending strength of 34 $Kg/cm^2$ after its heat treatment at 1000° C. for one hour. The hardening time measured in the same manner as Example 3 was 30 minutes.

EXAMPLE 8

(A) 60% of the petroleum-derived heavy oil as obtained in Example 2, (B) 30% of a mixture in equal amounts (by weight) of a fraction boiling at 165°–263° C. obtained by the distillation of a Khafji crude oil at atmospheric pressure and a fraction having a viscosity of 15 cp at 50° C. obtained by distilling the same crude oil at atmospheric pressure to obtain bottoms boiling at not lower than 380° C. and then distilling the thus obtained bottoms at a reduced pressure of 60 mm Hg and (C) 10% of the same aromatic petroleum resin having a softening point of 120° C. as used in Example 2, were mixed together to obtain a binder for tap hole mixes, having a viscosity of 1100 cp at 50° C.

Twenty-three (23) parts of the thus obtained binder were added to 100 parts of the refractory materials as indicated in Table 1 to form a blend which was then kneaded thereby to obtain a tap hole mix for blocking the pig iron tap hole of blast furnaces.

It took 5 minutes to make said blend uniformly kneaded. The injection pressure measured in the same manner as in Example 1 was 11 Kg/cm$^2$, and the mix exhibited a bending strength of 32 Kg/cm$^2$ after its heat treatment at 1000° C. for one hour. The hardening time measured in the same manner as in Example 3 was 30 minutes.

EXAMPLE 9

There were mixed together (A) 55% of the petroleum-derived heavy oil as obtained in Example 2, (B) a mixture in equal amounts (by weight) of a fraction boiling at 165°–263° C. obtained by the distillation of a Khafji crude oil at atmospheric pressure and a fraction having a viscosity of 15 cp at 50° C. obtained by distilling the same crude oil at atmospheric pressure to obtain bottoms boiling at not lower than 380° C. and then distilling the thus obtained bottoms at a reduced pressure of 60 mm Hg, (C) 7% of the same aromatic petroleum resin having a softening point of 90° C. as used in Example 1 and (D) 8% of a resol-type phenol resin having a molecular weight of 200, to obtain a binder for tap hole mixes, having a viscosity of 1200 cp at 50° C.

Twenty-three (23) parts of the thus obtained binder were added to a mixture of 100 parts of the refractory materials as indicated in Table 1 and 8 parts of powdery petroleum-derived pitch having a softening point of as high as 220° C. to form a blend which was then kneaded in a kneader heated to 50° C. thereby obtaining a tap hole mix for blocking the pig iron tap hole of blast furnaces. The kneadability of said blend in the kneader was very satisfactory, and it took 6 minutes to make the blend uniformly kneaded.

The tap hole mix so obtained was measured in injection property in the same manner as in Example 1 with the result that an injection pressure of 15 Kg/cm$^2$ was obtained. Further, the mix exhibited a bending strength of 43 Kg/cm$^2$ after having been heat treated at 1000° C. for one hour. Thus, the mix clearly showed excellent performances as compared with those obtained in Comparative examples 1, 2 and 3.

The hardening time measured in the same manner as in Example 3 was 15 minutes.

EXAMPLE 10

To 25 parts of the binder as obtained in Example 6 was added a mixture containing 100 parts of the refractory materials as indicated in Table 1, 5 parts of metallic silicon and 8 parts of powdery petroleum-derived pitch having a softening point of as high as 220° C., to form a blend which was then kneaded in a kneader heated to 50° C. thereby obtaining a tap hole mix for blocking the pig iron tap hole of blast furnaces.

The kneadability of said blend in the kneader was very satisfactory, and it took 6 minutes to make the blend uniformly kneaded.

The tap hole mix so obtained was measured for injection property in the same manner as in Example 1 with the result that an injection pressure of 15 Kg/cm$^2$ was obtained. The mix exhibited a bending strength of 70 Kg/cm$^2$ after having been heat treated at 1000° C. for one hour. In addition, the hardening time measured in the same manner as in Example 3 was 18 minutes.

What is claimed is:

1. A tap hole mix comprising (I) 100 parts by weight of at least one refractory material selected from the group consisting of chamotte, pyrophyllite, coke, clay, bauxite, alumina, carborundum and silicon carbide and (II) 15–40 parts by weight of a binder, characterized in that the binder comprises a petroleum-derived heavy oil having at least 25% Canradson carbon and an aromatic petroleum resin in a ratio by weight of 60–95:40–5.

2. A tap hole mix according to claim 1, wherein the binder further comprises a petroleum fraction boiling at not lower than 150° C.

3. A tap hole mix according to claim 1, wherein the binder further comprises a resol-type phenol resin.

4. A tap hole mix according to claim 1, wherein the binder further comprises a petroleum fraction boiling at not lower than 150° C. and a resol-type phenol resin.

5. A tap hole mix according to claim 1, wherein the aromatic petroleum resin has a softening point of 50°–160° C.

6. A tap hole mix according to claim 1, wherein the aromatic petroleum resin has a number average molecular weight of 500–2000.

7. A tap hole mix according to claim 2, wherein the fraction boiling at not lower than 150° C. has a viscosity of 100 centipoise at 50° C.

8. A tap hole mix according to claim 2, wherein the fraction boiling at not lower than 150° C. is at least one member selected from the group consisting of Fuel Oils of Nos. 1 to 5 grades prescribed by ASTM D 396, and lubricating oil fractions.

9. A tap hole mix according to claim 2, wherein the fraction boiling at not lower than 150° C. is used in an amount of not more than 60 parts by weight per 100 parts by weight of the petroleum-derived heavy oil having at least 25% Conradson carbon.

10. A tap hole mix according to claim 3, wherein the resol-type phenol resin is used in an amount of not more than 20 parts by weight per 100 parts by weight of the total of the petroleum-derived heavy oil having at least 25% Conradson carbon and the aromatic petroleum resin.

11. A tap hole mix according to claim 3, wherein the resol-type phenol resin is used in an amount of 3–15 parts by weight per 100 parts by weight of the total of the petroleum-derived heavy oil having at least 25% Conradson carbon and the aromatic petroleum resin.

12. A tap hole mix according to any one of claims 1 to 11, wherein the binder has a viscosity of 100–1000 centipoise at 50° C.

13. A tap hole mix according to any one of claims 1 to 11, further comprising a sintering agent.

14. A tap hole mix according to claim 1, further comprising (III) a resol-type phenol resin in an amount by weight of 3–15 parts per 100 parts of the total of the petroleum-derived heavy oil and the aromatic petroleum resin.

15. A tap hole mix according to claim 3, wherein the resol-type phenol resin has an average molecular weight of 100–500.

16. A tap hole mix according to claim 13, wherein the sintering agent is used in an amount of 3–20 parts by weight per 100 parts by weight of the refractory material.

17. A tap hole mix according to claim 13, wherein the sintering agent is previously incorporated in the refractory material.

18. A tap hole mix according to claim 13, wherein the sintering agent is powdery pitch comprising 10–80% of quinoline-insoluble matter and having at least 40% by weight of fixed carbon and a softening point of 90°–300° C.

19. A tap hole mix according to claim 13, wherein the sintering agent is powdery petroleum-derived pitch comprising 20–70% of quinoline-insoluble matter and having at least 40% by weight of fixed carbon and a softening point of 150°–250° C.

20. A tap hole mix according to claim 13, wherein the sintering agent is used in an amount of not more than 25 parts by weight per 100 parts by weight of the refractory material.

* * * * *